United States Patent [19]

Schilbach

[11] Patent Number: 4,753,453
[45] Date of Patent: Jun. 28, 1988

[54] ATTACHMENT FOR BABY PUSHER

[76] Inventor: Thomas G. Schilbach, 20 Fitzgibbon Crescent, Caulfield North, Victoria 3161, Australia

[21] Appl. No.: 876,010

[22] Filed: Jun. 19, 1986

[30] Foreign Application Priority Data

Dec. 28, 1984 [AU] Australia .................. PG8722

[51] Int. Cl.$^4$ .................................................. B62B 7/08
[52] U.S. Cl. ................................ 280/643; 280/642; 280/644; 280/647; 280/650; 280/658; 280/47.38
[58] Field of Search .................. 280/202, 289 R, 642, 280/643, 644, 647, 648, 650, 658, 47.38

[56] References Cited

U.S. PATENT DOCUMENTS 4,266,807  5/1981  Griffin .................. 280/644
4,346,912  8/1982  Habib .................... 280/644
4,542,915  9/1985  Wheeler, III et al. ...... 280/650

Primary Examiner—John J. Love
Assistant Examiner—Donn McGiehan
Attorney, Agent, or Firm—Andrus, Sceales, Starke & Sawall

[57] ABSTRACT

A second seat attachment for a baby stroller having two elongated members which, when the stroller is erect for use, extend upwardly and are inclined to the vertical, said stroller having interconnection means for said elongated members which enable the stroller to fold for storage or unfold for erection and in so doing cause said two elongated members to become more proximate when the stroller is to be stored and to move apart when the stroller is to be erected for use, said stroller having a seat for a first child.

14 Claims, 3 Drawing Sheets

ATTACHMENT FOR BABY PUSHER

This invention relates to a baby pusher, sometimes known as a stroller, and to an attachment for a baby pusher.

A range of baby pushers is available to a type which is foldable from an erect position by pivoting about a lateral axis and/or which sides of the pusher are caused to become more proximate. A particular example of such a pusher is that known as "The MacLaren".

However, most pushers are designed to seat only one child.

Twin side-by-side and in line pushers are known, but are inclined to be bulky and are usually only purchased by parents having twin children.

However, it often happens that parents may have two children born within a period of, say 2¼ years, and find that the eldest child is not yet ready to vacate a single child pusher before that pusher is also required for the youngest child.

Accordingly, the present invention seeks to provide an attachment for a pusher and a pusher with such attachment and which attachment is itself capable of seating a child.

The present invention provides an attachment for a child pusher of the type having sides which are causable to become more proximate when the pusher is to be stored and to move apart when the pusher is to be used and having a seat for a first child; the attachment comprising frame means defining two sides of the attachment and which support or which are capable of supporting a seat for a second child and wherein the two sides of the attachment are capable of becoming more proximate for storage or moving apart when use is desired.

In a particularly preferred instance the present invention provides an attachment for a pusher of the type having two elongate members which, when the pusher is erect for use, extend upwardly and are inclined to a vertical and interconnection means for said elongate members which enable the pusher to fold for storage or unfold for erection and in so doing cause said two elongate members to become more proximate when the pusher is to be stored and to move apart when the pusher is to be erected for use and having a seat for a first child; the attachment comprising two sides mounted or mountable to said elongate members and movable with them as they become more proximate to also become more proximate to one another and as they move apart to also move apart and which two sides support or are capable of supporting a seat for a second child.

The two sides preferably each comprise two longitudinal members which extend, respectively, generally horizonatally and generally vertically when the pusher and the attachment are erect for use.

One of said two longituidnal members is preferably adapted to be demountably mounted to the respective one said two elongate members; the other of said two longitudinal members is preferably adapted to be pivotally mounted to the respective one of said two elongate members and said two longitudinal members are preferably pivotally mounted to one another whereby, with said one of said two lontiduinal members demounted from the respective one of said two elongate members, said two longitudinal members may pivot in use respectively with respect to the respective one of said two elongate members and with respect to one another to lie generally parallel to said two elongate members.

When said two longitudinal members lie generally parallel to said two elongate members the pusher may be folded for storage as aforesaid.

The ones of said longitudinal members which are generally horizontal when the pusher is erect preferably support between them a base of a seat for a second child.

Said two longitudinal members of each side of the attachment are preferably able to move laterally with respect to one another as so doing facilitates folding and unfolding of the pusher.

Means is preferably provided to space the two sides of the attachment a predetermined distance apart when the pusher and the attachment are together and erect for use. That means to space the two sides is preferably capable of folding in use as the two sides of the attachment move to become more proximate when the pusher is folded. Said means to space the two sides preferably comprises two arms mounted at one end to a respective one of the two sides of the attachment and, at the other end, to one another. Latch means is preferably provided to releasably maintain the spacing apart of the two sides of the attachment. That releasable latch means may include an over-the centre mechanism.

One other or both of the two longitudinal members of each side of the attachment preferably carries a frame for a seat back for the second child. That frame preferably can pivot in use to also lie generally parallel to said two elongate members.

The frame for the back of a seat for the second child preferably comprises two members which can also move to be more proximate to one another in use when the pusher is folded for storage or move apart when the pusher is erected for use.

The frame for the back of a seat for a second child preferably includes cross-bracing means which can fold and unfold.

Said other of said two longitudinal members may be permanently mounted to the respective one of said two elongate members but this is not preferred as it will probably be desirable to remove the attachment at some time. Accordingly, mounting means for mounting the attachment to the pusher preferably will enable the attachment to be detached. One form of mounting means comprises clamps which can clampingly engage with said elongate members.

In the case of certain pushers, said elongate members may be comprised of several parts which are connected together and which may fold and the expression "elongate member" is not to be construed as restricted to a single unitary formed member.

A specific construction of an attachment in accordance with this invention and its manner of use with a pusher will now be described with the aid of the accompanying drawings in which.

Figure 1:
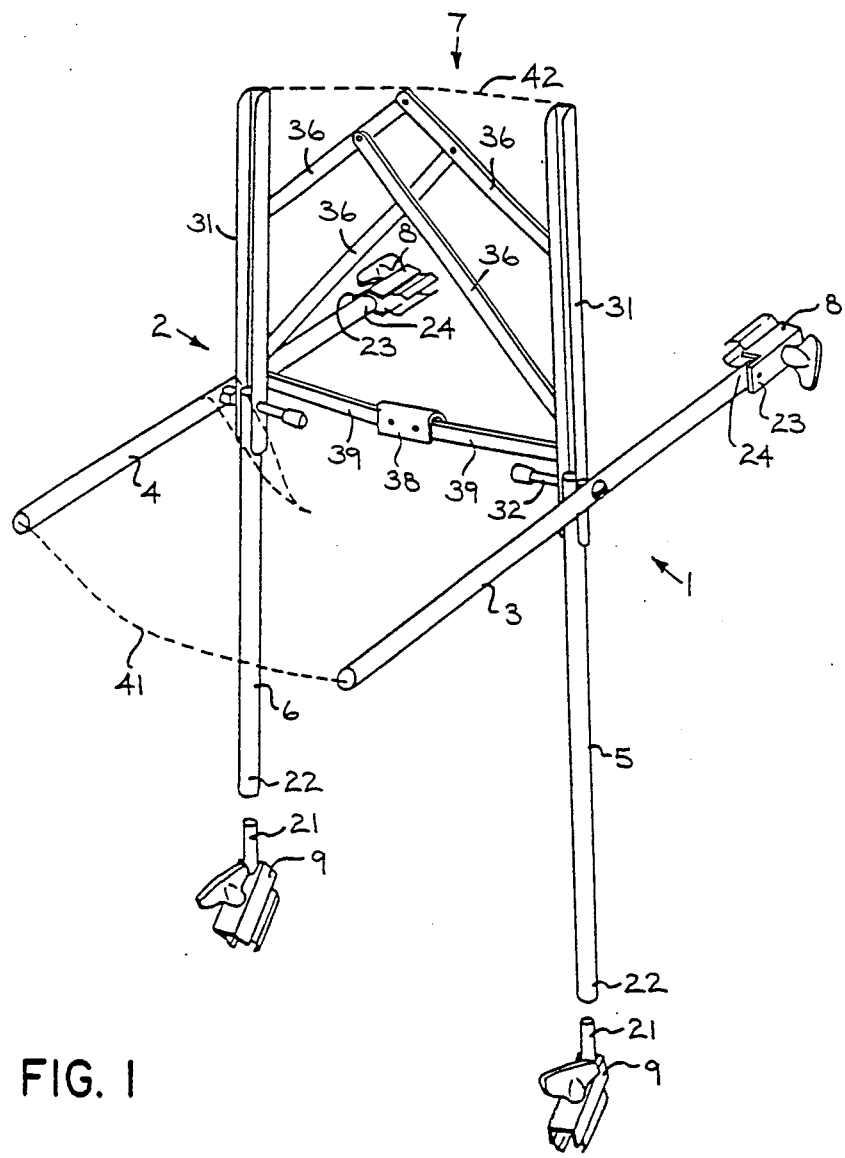
FIG. 1 is a perspective view of the attachment.

The attachment shown in FIGS. 1–4 comprises sides 1 and 2 formed by seat base support members 3 and 4 and generally vertical members 5 and 6, a seat back frame 7 and mounting means 8 and 9.

The mounting means 8 and 9 are identical excepting that the mounting means 9 has a pin 21 over which the ends 22 of the generally vertical members 5 and 6 may be received whereas the mounting means 8 has a projection 23 by means of which the mounting means 8 may be secured to the ends 24 of the seat base support members 3 and 4. If desired, the pin 21 may be pivotally mounted to the mouting means 9 to enable fitment to a large range of pushers.

Apart from those differences, the mounting means 8 and 9 each comprise securement means whereby they may be attached to tubular members of a pusher.

Figure 3:
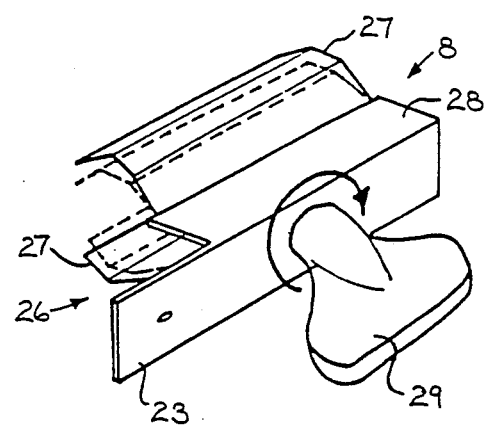
FIG. 3 is a detail view of part of the attachment.

Those securement means conveniently comprise clamp mechanisms 26 themselves comprising plates 27 which can be drawn into channels 28 by thumbscrews 29 and so clamp as shown by dash lines in FIG. 3.

Figure 2:
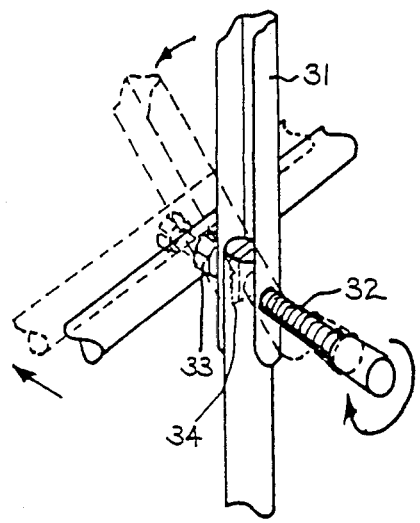
FIG. 2 is a detail view of part of the attachment.

The seat base support members 3 and 4, generally vertical members 5 and 6 and side members 31 of the seat back frame are secured together as shown in FIG. 2 by means of a bolt 32 and two nuts 33 and 34. It is to be noted that the nuts 33 and 34 and bolt 32 permit lateral movement of the seat base support members 3 and 4 with respect to the generally vertical members 5 and 6 as shown by dash lines, to enable fitment to a range of pushers. Further the side members 31 can pivot about the bolt 32 as shown by dash lines.

The seat back frame 7 comprises the side members 31, cross bracing arms 36 which are pivotally mounted to the side members and which also serve to support a seat back and an over-the-centre latch mechanism 37 comprised of a channel member 38 and arms 39 which are pivotally attached to the side members 31 and the channel member 38.

Figure 4:
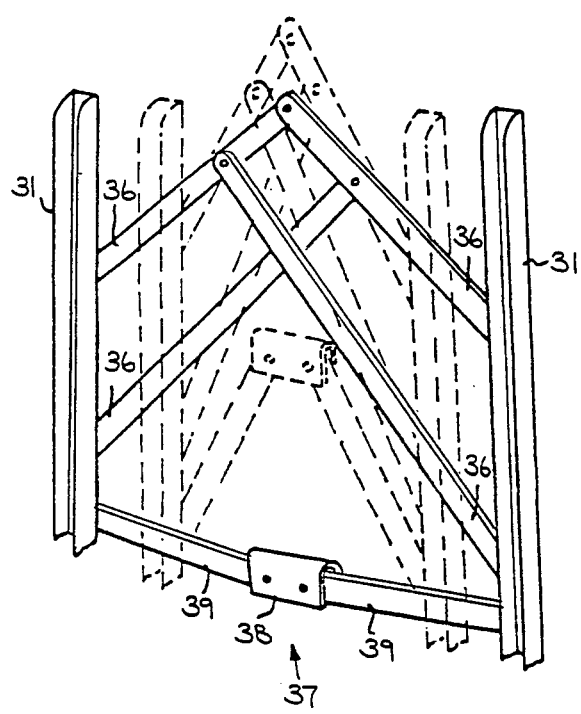
FIG. 4 is a detail view of part of the attachment.

When the over-the-centre mechanism 37 is in the full line position shown in FIG. 4, the side members 31, and also the members 3 and 4, and 5 and 6 will be constrained against movement towards one another.

The attachment additionally comprises a loose seat cover shown in dash line in FIG. 1 comprised of a base 41 and a back 42. That seat cover may include padding and/or stiffeners.

One mode of use of the attachment is as shown in FIGS. 5–8 in which the attachment is shown in association with a foldable pusher having sides defined in part by inclined elongate members 51 and 52.

The mounting means 8 are attached to the members 51 and the mounting means 9 are attached to the members 52.

Figure 5:
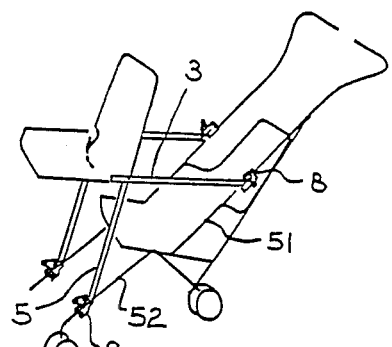
FIGS. 5–8 are perspective views showing how the attachment may co-operate with a pusher.

As shown in FIG. 5, the ends 22 are received on the pin 21 and the attachment is ready for use.

Figure 6:
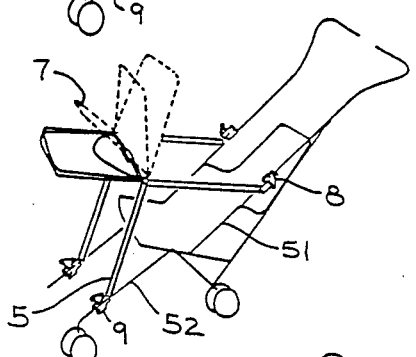

As shown in FIG. 6, the seat back frame 7 may be folded forward to lie on the seat base 41 to enable the youngest child to be placed in the pusher itself and thereafter the seat back frame 7 may be folded to be upright to enable the elder child to be placed on the seat base 41.

Figure 7:
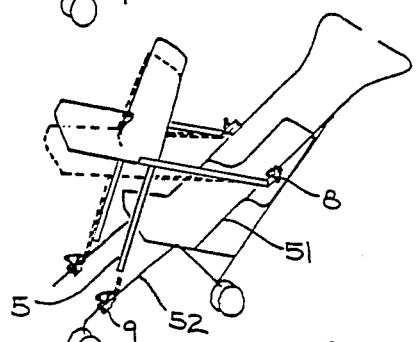
Figure 8:
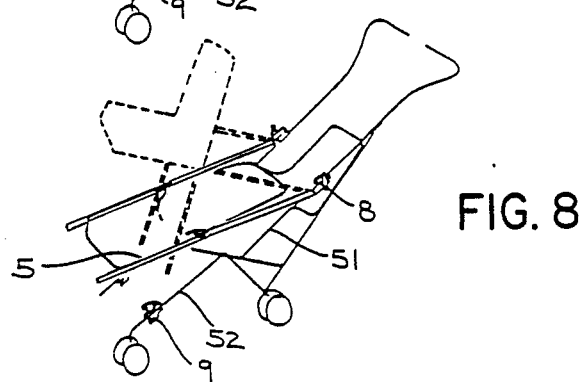

To fold the pusher and the attachment, the ends 22 are released from the pins 21 as shown in FIG. 7, the members 5 and 6 are pivotted about the bolts 32 to lie parallel with the members 3 and 4 (as shown in FIG. 8) and the over-thecentre mechanism 37 is released to enable the seat back frame 7 to fold and to enable the members 3 and 5, and 4 and 6 to move towards one another as the pusher is folded in a manner appropriate to itself.

The above described attachment can be cheaply and easily made of metal tubing and bar or of any other suitable material and will be found effective in converting a single child pusher into a two child pusher.

Modifications and adaptations may be made to the above described without departing from the spirit and scope of this invention which includes every novel feature and combination of features disclosed herein.

The claims defining the invention are as follows:

1. An attachment for a pusher of the type having two elongated members which, when the pusher is erect for use, extend upwardly and are inclined to the vertical, said pusher having interconnection means for said elongated members which enable the pusher to fold for storage or unfold for erection and in so doing cause said two elongated members to become more proximate when the pusher is to be stored and to move apart when the pusher is to be erected for use, said pusher having a seat for a first child, said attachment comprising:

a pair of side member means mountable on said elongated members and movable with said elongated members as they become more proximate to also become more proximate to one another and as said elongated members move apart to also move apart, said side member means supporting a seat for a second child, said two side member means each comprising a pair of longitudinal members, said longitudinal members of each side member means being pivotally joined to one another, one of said members extending generally horizontally and the other of said members extending vertically when the pusher and the attachment are erect for use.

2. An attachment as claimed in claim 1 wherein one of said two longitudinal member is adapted to be removably mounted to the respective one of said elongated members and the other of said longitudinal members is adapted to be pivotally mounted to the respective one of said two elongated members, whereby, with said one of said two longitudinal members removed from the respective one of said two elongated members, said two longitudinal members may pivot in use with respect to said elongated members and with respect to one another to lie generally parallel to said two elongated members.

3. An attachment as claimed in claim 1 wherein the ones of said longitudinal members that are generally horizontal when the pusher is erect support a base of a seat for a second child between them.

4. An attachment as claimed in claim 1 wherein said two longitudinal members of each side member means of the attachment are able to move laterally with respect to one another.

5. An attachment as claimed in claim 1 wherein means is provided to space said side member means of the attachment a predetermined distance apart when the pusher and attachment are together and erect for use.

6. An attachment as claimed in claim 5 wherein said spacing means is capable of folding in use as the two side member means of the attachment move to become move proximate when the pusher is folded.

7. An attachment as claimed in claim 6 wherein said spacing means comprises a pair of arms, one end of said arms being mounted on a respective one of the two side members means of the attachment and wherein the other ends of said arms are coupled to one another.

8. An attachment as claimed in claim 7 further including latch means operatively associated with said other ends of said arms to releasably maintain the spaced apart condition of said two side member means of the attachment.

9. An attachment as claimed in claim 8 wherein said latch means includes an over-center mechanism.

10. An attachment as claimed in claim 1 wherein said side member means include a frame for a seat back for the second child.

11. An attachment as claimed in claim 2 wherein said side member means includes a frame for a seat back for the second child and wherein said seat back frame is adapted to pivot in use to also lie generally parallel to said two elongated members.

12. An attachment as claimed in claim 10 wherein said back seat frame comprises a pair of members coupled to said side member means for movement to be more proximate to one another when the pusher is folded for storage and to move apart when the pusher is erected for use.

13. An attachment for a pusher of the type having two elongated members which, when the pusher is erect for use, extend upwardly and are inclined to the vertical and interconnection means for said elongated members which enable the pusher to fold for storage or unfold for erection and in so doing cause said two elongated members to become more proximate when the pusher is to be stored and to move apart when the pusher is to be erected for use, said pusher having a seat for a first child, the attachment comprising: two side member means mountable to said elongated members and movable with said elongated members as they become more proximate to also become more proximate to one another and as said elongated members move apart to also move apart, said side member means supporting a seat for a second child, said two side member means each comprising two longitudinal members which extend, respectively, generally horizontally and generally vertically when the pusher and the attachment are erect for use, one of said two longitudinal members being adapted to be removably mounted to the respective one said two elongated members; the other of said two longitudinal members being adapted to be pivotably mounted to the respective one of said two elongated members, and said two longitudinal members being pivotally mounted to one another whereby, with said one of said two longitudinal members demounted from the respective one of said two elongated member, said two longitudinal members may pivot in use with respect to the respective one of said two elongated members and with respect to one another to lie generally parallel to said two elongated members.

14. An attachment for a pusher of the type having two elongated members which, when the pusher is erect for use, extend upwardly and are inclined to the vertical and interconnection means for said elongated members which enable the pusher to fold for storage or unfold for erection and in so doing cause said two elongated members to become more proximate when the pusher is to be stored and to move apart when the pusher is to be erectd for use, said pusher having a seat for a first child, the attachment comprising: two side member means mountable to said elongate members and movable with said elongated members as they become more proximate to also become more proximate to one another and as said elongated members move apart to also move apart, said two side member means supporting a seat for a second child, wherein the two side member means each comprise two longitudinal members which extend, respectively, generally horizontally and generally vertically when the pusher and the attachment are erect for use, wherein at least one of said two longitudinal members of each side member means of the attachment carried a frame for a seat back for the second child, said frame for the seat back for the second child comprising two members which can also move to be more proximate to one another in use when the pusher is folded for storage or move apart when the pusher is erected for use.

* * * * *